United States Patent
Casey et al.

[11] Patent Number: 6,110,552
[45] Date of Patent: Aug. 29, 2000

[54] RELEASE LINERS FOR PRESSURE SENSITIVE ADHESIVE LABELS

[75] Inventors: James M. Casey, Brookfield; David A. Kitch, Charlton, both of Mass.; John M. Becker, Mokena, Ill.

[73] Assignee: FLEXcon Company, Inc., Spencer, Mass.

[21] Appl. No.: 09/208,159

[22] Filed: Dec. 9, 1998

Related U.S. Application Data

[63] Continuation of application No. 08/792,447, Jan. 31, 1997, abandoned.

[51] Int. Cl.⁷ .............................. B32B 27/10; B32B 7/12
[52] U.S. Cl. ........................ 428/40.1; 428/41.8; 428/202; 428/352; 428/537.5
[58] Field of Search .................. 428/40.1, 41.8, 428/317.1, 317.3, 317.7, 202, 343, 352, 354, 537.5

[56] References Cited

U.S. PATENT DOCUMENTS

| | | |
|---|---|---|
| 4,447,485 | 5/1984 | Aritake ................. 428/354 X |
| 4,713,273 | 12/1987 | Freedman . |
| 4,801,487 | 1/1989 | Kalus et al. ............. 428/352 X |
| 4,946,532 | 8/1990 | Freedman . |
| 5,194,324 | 3/1993 | Poirier ................. 428/317.3 X |
| 5,308,693 | 5/1994 | Ryle et al. ............. 428/315.5 X |
| 5,372,669 | 12/1994 | Freedman . |
| 5,691,022 | 11/1997 | Knauf .................. 428/40.1 |
| 5,843,549 | 12/1998 | Mingus ................. 428/41.8 X |
| 5,876,818 | 3/1999 | Petershofer et al. ...... 428/41.8 X |

OTHER PUBLICATIONS

FLEXcon Liner Specification Sheet (one page) for liner #ME–2.
FLEXcon Liner Specification Sheet (2 pages) for liner #ASD–4.

*Primary Examiner*—Daniel Zirker
*Attorney, Agent, or Firm*—Samuels, Gauthier & Stevens

[57] ABSTRACT

A release liner for use with face stocks for pressure sensitive labels, tapes, decals and other products formed from sheet and roll stock. A filled polymer is laminated to one side of a paper web. An extrudate is laminated to the other side of the paper substrate to form a release liner. The filled polymer has paper-like properties and replaces paper tissue back liners.

22 Claims, 1 Drawing Sheet

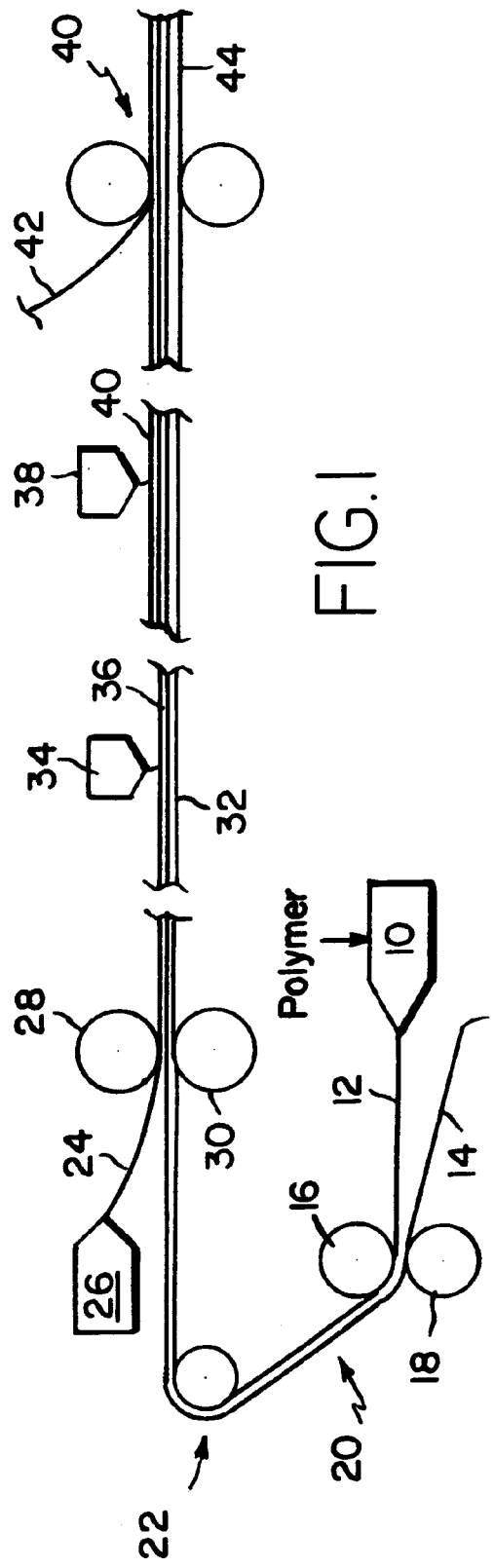
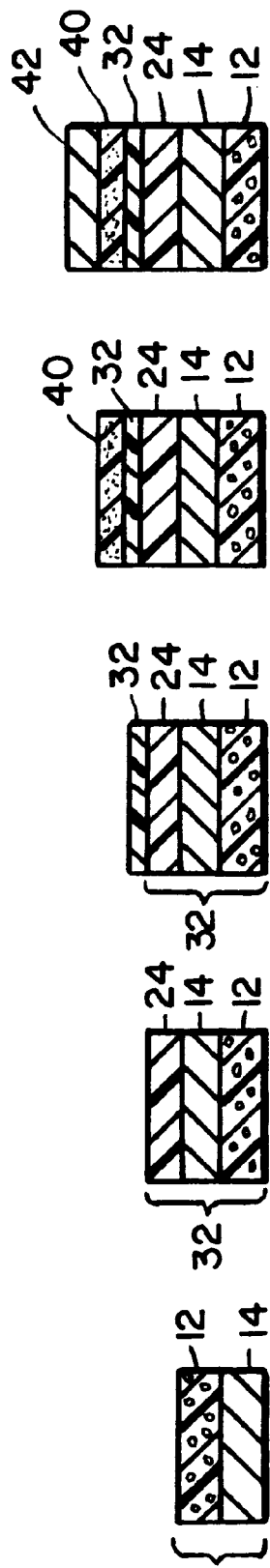

RELEASE LINERS FOR PRESSURE SENSITIVE ADHESIVE LABELS

This is a continuation of application Ser. No. 08/792,447 filed on Jan. 31, 1997, now abandoned.

FIELD OF THE INVENTION

Release liners for pressure sensitive adhesive labels.

BACKGROUND AND BRIEF SUMMARY OF THE INVENTION

In the manufacture of pressure sensitive adhesive labels, particularly electronically imaged sheet labels, various types of siliconized release liners are used. Most of the siliconized release liners use a bleached super-calendered or clay-coated Kraft paper. For "shelf marker" or "shelf talker" sheet labels, a polycoated paper tissue-back release liner is used.

The paper tissue-back liner provides the desired properties of roughness, coefficients of static and kinetic friction, blocking resistance and moisture barrier to enable the labels to be stacked and fed into a printer such as a laser printer. The coefficients of static and kinetic friction, which are partially a result of the roughness, primarily facilitate the transfer of a label through the printer. The blocking resistance, also partially a result of the roughness, primarily ensures that the liner-backed labels remain stacked without displacing themselves one to the other, while easily releasing themselves one from the other, when being removed from the stack and fed to the printer. The moisture barrier property of the paper tissue-back liner ensures that the liner-backed labels remain dimensionally stable. However, in an environment of high humidity, the paper tissue absorbs water vapor and the liner tends to upcurl. In an environment of low humidity the paper tissue disorbs water vapor and the liner tends to down curl.

There are several drawbacks to the use of the paper tissue-back liner. The machines for electronically printing labels cannot usually handle labels greater than 10.5 to 11 mils in thickness. The use of the paper tissue in combination with the other layers of the label, results in the label approaching the maximum design thickness that the printer can handle which is not desirable because of the potential for jamming the printer. The paper tissue in a non-laminated state is fragile and difficult to handle. In order to produce the tissue backed liner, a base paper is extrusion coated with a nonfilled polymer, typically LDPE. The tissue is laminated to the polymer at the extrusion nip, while the polymer is still molten. Once the polymer cools, the tissue is permanently bonded to the base paper. The non-coated side of the base paper is then extrusion coated with another polymeric layer, which polymeric layer is then silicone coated, usually in a separate operation.

Laminating the tissue to the polymer requires a separate unwind operation for the tissue, which increases waste and reduces productivity. Expertise is required in achieving the proper machine tension settings to laminate the tissue without wrinkles. Because the tissue is so fragile, breaks in the tissue are common, leading to machine down time and waste. Any defects in the tissue can lead to the entire liner being unacceptable. Additionally, the paper tissue itself is a relative costly component of the final label.

One object of the present invention is to replace the paper tissue-back release liner with a less expensive yet equally effective release liner.

Another object of the invention is to form the release liner on line.

Still another object of the invention is to provide a release liner which generally can be used as sheet liner or roll liner.

With the present invention, the prior art paper tissue is replaced by a filled polymer which provides several advantages. There is a reduction in the thickness of the final label because the single layer of filled polymer is thinner than the tissue paper/polymer composite. The filled polymer is less costly than the paper tissue and the filled polymer can be extrusion coated and processed on-line in the formation of a release liner.

The filled polymer has certain paper-like properties substantially similar to the properties of the paper tissue. The paper-like properties of the filled polymer are determined primarily by the properties of roughness, blocking resistance and coefficients of static and kinetic friction. The filled polymer also functions as a moisture barrier which dimensionally stabilizes the release liner and the final label. The filled polymer does not absorb and desorb water vapor in environments of high and low humidity and therefore, the release liner of the invention is not susceptible to curling.

Broadly the invention comprises a filled paper-like olefinic resin base layer extrusion coated onto one side of a paper substrate to form a synthetic paper-like laminate release liner base.

In a preferred embodiment of the invention, polyethylene extrusion resins are loaded with filler material in a range of 10–65% by weight, preferably 15 to 40% by weight based on the total weight of the final filled polyethylene resin.

In a particularly preferred embodiment, an olefinic extrudate is laminated to the other side of the paper substrate to form a release liner.

In another embodiment of the invention the release liner is characterized by a release film coated on the extrudate.

In still another embodiment of the invention, pressure sensitive adhesive is coated onto the release film.

In still another embodiment of the invention, a face stock is adhered to the pressure sensitive adhesive to form a label.

Also within the scope of the invention is the method of manufacture of the release liner in its various alternative embodiments as just described.

BRIEF DESCRIPTION OF THE DRAWINGS

FIG. 1 is a flow diagram of a process embodying the invention;

FIG. 2 is a sectional view of a laminate release liner base;

FIG. 3 is a sectional view of a release liner;

FIG. 4 is a sectional view of the release liner of FIG. 3 coated with a release film;

FIG. 5 is a sectional view of a release liner of FIG. 4 coated with a layer of pressure sensitive adhesive; and FIG. 6 is a sectional view of a label.

DESCRIPTION OF THE PREFERRED EMBODIMENT(S)

In the present invention a paper web is used as a substrate or intermediate laminae to provide dimensional stability to the release liner. One side of the paper web is extrusion coated with a filled polymeric material which itself has paper-like characteristics and has at least the roughness, blocking resistance and coefficients of static and kinetic friction properties which make the release liner especially suitable for use as a sheet liner for sheet stock. The other side of the paper substrate is extrusion coated with an extrudate, e.g. polyethylene. The extrudate is coated with a release film forming a coated release liner. The coated release liner is combined with a layer of pressure sensitive adhesive and face stock to form a label.

Although the preferred embodiment is described in reference to the use of medium density extrusion coating grade polyethylene for the base layer and low density extrusion coating grade polyethylene for the extrudate, other polymers or copolymers may be employed, such as polypropylene, polyethylene terephthalate, acrylonitrile, butadiene, styrene, nylon, polystyrene and other appropriate extrudable thermoplastics. Preferred polymers include polypropylene, high density polyethylene, medium density polyethylene, low density polyethylene, high molecular weight HDPE, linear low density polyethylene, straight chained or branched or blends thereof. Further the polymer or copolymer used may be the same or different for the base layer and the extrudate. The polymers can range in density from 0.85 to 1.40, preferably from 0.90–0.95 (g\cc) and have a melt index from 1.0–20 (g\10 min.). The polymers can be extruded in a thickness between 0.4 to 1.6 mils preferably 0.7–1.2 mils.

The polymer used for base layer is loaded with filler material forming a filled polymer. Preferably the filled polymer is pelletized. Alternatively, the filler can be mixed in the charge of polymer (film forming resin) which is fed to an extrusion orifice associated with the formation of the base layer. The extruded filled polymer has paper-like properties. The outer, exposed, surface should have a roughness of between about 10 to 400 Sheffield units, preferably between about 150 to 350 Sheffield units, exhibit blocking resistance and have coefficients of static and kinetic friction each between about 0.1 to 0.6. These values are determined by the TAPPI standards set forth in the examples that follow.

The filler used is preferably loaded in the polymer in an amount of 15–40% by weight based on the total weight of the filled polymer. Preferred fillers are inert particulates, either organic or inorganic, having an average size of less than 50 microns. The particulates may be spherical or any non-spherical configuration. As loaded into the polymer the particulates can be uniform in size, non-uniform in size or any combination of sizes. Preferred particulates include glass beads and/or calcium based products. However other particulates believed to be suitable include clay, silica, mica, talc and titanium dioxide.

The ratio of filler to polymer is selected to ensure that the proper roughness, blocking resistance and coefficients of static and kinetic friction properties are achieved. The surface of the base layer can be roughened by the mechanical effect of the filler material, the matte finish on the roll which contacts the surface or a combination of both.

To impart other properties to the filled polymer, additives may be incorporated therein. If antistatic properties are desired, commercially available additives can be used. These additives include but are not limited to quaternary ammonium salts, including sulfate compounds, e.g. Cyastat LS, Cytec Industries (3-Lauramidopropyl) triethylammonium methyl sulfate; chloride compounds, e.g. Arquad 18–50 and Arquad T, Armour Industry Chemical); glycerol monostearates, e.g. Atmer 129, ICI Americas and Pationic 901, Patco American Ingredients; and amides, e.g. lauric diethanolamides and ethoxylated amines.

The release film is preferably a silicone chemistry or other low surface energy polymer (i.e., Fluorocarbon) from which the pressure sensitive adhesive has a relatively low bond (peel force). Commercially available release chemistries include condensation or free radical cured polymers from solvent, solventless, emulsion and radiation cured (UV/EB) systems.

Pressure sensitive adhesives typically used for label stock applications are based on acrylic, vinyl acrylic polymers, multiple polymers or tackified synthetic and natural rubber polymers. The adhesives must possess peel, tack and shear characteristics consistent with converting, dispensing and end use application requirements. Examples of such pressure sensitive adhesives commercially available from FLEXcon, Spencer MA include FLEXcon V-38, V-68 and V-183.

Face stocks suitable for pressure sensitive film label applications include synthetic films based on polymers selected from the group consisting of polyvinyl chloride, polyesters, and filled olefinic resins e.g., polypropylenes and/or polyethylenes. The thicknesses of the face stock can range from 1.0–8.0 mils but are typically in the range of 1.5–4.0 mils. As is well known in the art these films can incorporate fillers and additives to impart physical or functional characteristics such as heat resistance, opacity, flexibility or gloss control.

There are many alternatives in the manufacturing process for pressure sensitive adhesive labels. The release film of the release liner may be coated with a layer of pressure sensitive adhesive for subsequent transfer of the pressure sensitive adhesive to the face stock with which the liner is adhered. When the face stock is combined with the liner, the adhesive is joined to the face stock. Later the liner is removed to expose the adhesive which now remains permanently joined to the face stock. The pressure sensitive adhesive can be first coated on the face stock and subsequently joined to the release liner.

The base layer and/or extrudate may pass from the extrusion die through a nip formed by chilled finishing rolls, polysteel rolls, silicone rubber rolls or combinations thereof. Either or both sides of the base layer and extrudate may be given a matte or gloss finish if desired.

It will be understood that the steps in the operation of the invention, as shown in FIGS. 3–6, can be effected at the same or different facilities by the same or different manufacturers.

Face stock which is formed into labels is usually wound and unwound in roll form and is therefore known as roll stock and the liner is called roll liner. Face stock is also cut into sheets and stacked and is referred to as sheet stock and sheet liner. The is invention applies, to roll stock, roll liner, sheet stock and sheet liner. Materials and procedures used for sheet stock and sheet liner maybe the same and/or may differ to some degree for those used for roll stock and roll liner but the principals of construction in manufacture of the release liner of the invention can be similar whether it be liner for roll stock or sheet stock.

EXAMPLE 1

Referring to FIG. 1 a medium density polyethylene extrusion grade polymer (0.93–0.95 g/cc) having 25% by weight filler loading, specifically 25–50 micron diameter silicon/calcium glass beads, was charged to an extruder 10. The medium density polyethylene is formed by blending high density polyethylene (0.947–0.953 g/cc) with a low density polyethylene (0.907–0.928 g/cc) in a ratio of 2:1 by weight, HDPE/LDPE. A filled polymeric base layer 12 was extruded at a temperature of about 600° F. and a thickness of one mil. A paper substrate 14, International Paper-Bastrop's 70# grade 0612 Reel Cote paper was nipped to the base layer 12 by a matte chill roll, 70° F., and a drive roll 18 at a pressure of about 100 psi. Both surfaces of the paper 14 had previously been chemically treated with an aqueous solution of polyethyleneimine to improve the adhesion properties of the surfaces of the paper 14. The laminated base film 12 and paper 14 formed a laminate release liner base 20. The release liner base 20 was reversed at 22 and an extrudate 24 of low density polyethylene extrusion grade polymer and having a thickness of about 1 mil from the extruder 26 was laminated to the release liner base 20 by rollers 28 and 30 at a pressure of about 100 psi to form a release liner 32.

A coater 34 applied a silicone release film 36 to the release liner 32.

EXAMPLE 2

A release liner 32 was produced under the process conditions described for Example 1 except that the layer 12 was loaded, 25% by weight, with a combination of glass beads as described above and dolomite particles (calcium based agglomerates average 5 micron diameter) in a ratio of 50/50 by weight.

The roughness of the base layer 12, based on TAPPI T-538 om-96, 1996, for Examples 1 and 2 was 295 and 290 Sheffield units respectively.

There was no blocking exhibited by the base layer 12, for Examples 1 and 2, based on TAPPI UM-565, 1991.

The coefficients of static and kinetic friction based on TAPPI T-549 pm-90, 1990, were for Example 1 static 0.19 and kinetic 0.18 and for Example 2 static 0.16 and kinetic 0.19.

Referring to FIGS. 1, 5 and 6, label stock was made from the release liner 32 of Examples 1 and 2. A coater 38 applied a pressure sensitive adhesive 40, FLEXcon's V-38, to the coated release liner 32. Then polyvinyl chloride face stock 42, coated with a laser receptive primer to improve toner fusion, was laminated to the adhesive 40 to form label stock 42. This type of primed face stock is well known to those skilled in the art. The label stock was fed through a Lexmark 4039 laser printer without difficulty.

Alternatively the pressure sensitive adhesive 40 can be applied to the face stock 42 in a separate step and then the face stock 42 with pressure sensitive adhesive 40 is adhered to the release film 36.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. A composite release liner for use with label face stock, said release liner comprising:
    a paper substrate having first and second sides; and
    a paper-like polymer base layer extrusion coated onto the first side of said paper substrate, the polymer of said base layer being selected from the group consisting of polypropylene, high density polyethylene, medium density polyethylene, low density polyethylene, high molecular weight HDPE, linear low density polyethylene, and straight chained or branched or blends thereof, said paper-like polymer base layer containing filler material and having an exposed surface with a roughness of between about 10 to 400 Sheffield units and with coefficients of static and kinetic friction of between about 0.1 to 0.6.

2. The composite release liner component of claim 1, wherein the paper-like polymer base layer includes a polymer having a density of between about 0.85 to 1.40 (g/cc).

3. The composite release liner component of claim 1, wherein the paper-like polymer base layer includes a polymer having a density of between about 0.90 to 0.95 (g/cc).

4. The composite release liner component of claim 1, wherein the paper-like polymer base layer includes a medium density polyethylene having a density of between about 0.93–0.95 (g/cc).

5. The composite release liner component of claim 1, wherein the paper-like polymer base layer includes a polymer having a melt index between about 1.0 to 20 (g\10 min.).

6. The composite release liner component of claim 1, wherein the paper-like polymer base layer is extruded to a thickness of between 0.4 to 1.6 mils.

7. The composite release liner component of claim 1, wherein the paper-like polymer base layer is extruded to a thickness of between 0.7 to 1.2 mils.

8. The composite release liner component of claim 1, having between about 15 to 40% by weight of the filler material in the paper-like polymer base layer based on the total weight of the base layer.

9. The composite release liner component of claim 1, wherein said filler material is an inert particulate material having average size of less than about 50 microns.

10. The composite release liner component of claim 1, wherein said filler material is selected from the group consisting of glass beads, calcium based products, clay, silica, mica, talc, and titanium dioxide.

11. The composite release liner component of claim 1, wherein the exposed surface of the paper-like polymer base layer does not exhibit blocking.

12. The composite release liner component of claim 1, wherein said roughness is between about 150 to 350 Sheffield units.

13. The composite release liner component of claim 1, further comprising a polymeric second layer extruded onto the second side of said paper substrate.

14. The composite release liner component of claim 13, wherein said polymeric second layer is selected from the group consisting of polypropylene, polyethylene terephthalate, high density polyethylene, medium density polyethylene, low density polyethylene, acrylonitrile, butadiene, styrene, nylon and polystyrene.

15. The composite release liner component of claim 13, wherein said polymeric second layer is selected from the group consisting of polypropylene, high density polyethylene, medium density polyethylene, low density polyethylene, acrylonitrile, butadiene, styrene, nylon and polystyrene.

16. The composite release liner component of claim 13, wherein said polymeric second layer is selected from the group consisting of polypropylene, high density polyethylene, medium density polyethylene and low density polyethylene.

17. The composite release liner component of claim 13, further comprising:
    a release film on the outer surface of said polymeric second layer.

18. The composite release liner component of claim 17, wherein said release film is a silicone-based film.

19. The composite release liner component of claim 17, further comprising:
    a pressure sensitive adhesive adhered to the release film.

20. The composite release liner component of claim 19, wherein the pressure sensitive adhesive is selected from the group consisting of acrylics, vinyl acrylics, tackified synthetic and natural rubber polymers.

21. The composite release liner component of claim 17, further comprising:

a label face stock laminated to said pressure sensitive adhesive.

22. The composite release liner component of claim 21, wherein the label face stock is selected from the group consisting of polyvinyl chloride, polyester, polypropylene and/or polyethylene polymers.

* * * * *